United States Patent [19]

Steward et al.

[11] 4,211,590
[45] Jul. 8, 1980

[54] METHOD OF MAKING PERFORATED CONTOURED TRIM PANEL

[75] Inventors: Raymond G. Steward, Port Huron; Stuart G. Boyd, North Street, both of Mich.; Frank P. Civardi, Wayne, N.J.

[73] Assignee: Inmont Corporation, Clifton, N.J.

[21] Appl. No.: 926,898

[22] Filed: Jul. 21, 1978

[51] Int. Cl.² .............................................. B32B 5/18
[52] U.S. Cl. ........................................ 156/79; 156/245; 156/253; 264/46.5; 264/156; 264/321; 296/214; 428/138; 428/315
[58] Field of Search ................ 156/79, 87, 253, 245; 264/51, 156, 230, 321, 46.5; 296/137 A; 181/290; 428/71, 138, 315

[56] References Cited

U.S. PATENT DOCUMENTS

| | | | |
|---|---|---|---|
| 3,257,263 | 6/1966 | Miller | 428/160 |
| 3,506,532 | 4/1970 | Bock et al. | 428/163 X |
| 3,507,728 | 4/1970 | Bock et al. | 156/196 |
| 3,526,564 | 9/1970 | Crawford | 428/71 |
| 3,531,367 | 9/1970 | Karsten | 428/315 |
| 3,616,020 | 10/1971 | Whelan | 156/243 |
| 3,637,459 | 1/1972 | Parish et al. | 428/332 X |
| 3,755,063 | 8/1973 | Massey et al. | 428/215 |
| 3,861,994 | 1/1975 | Stark | 428/315 X |
| 3,936,565 | 2/1976 | Good | 428/321 X |
| 3,966,526 | 6/1976 | Doerfling | 156/224 |
| 4,020,207 | 4/1977 | Alfter et al. | 428/315 X |
| 4,043,589 | 8/1977 | Alfter et al. | 296/137 A |

*Primary Examiner*—Henry F. Epstein
*Attorney, Agent, or Firm*—Harness, Dickey & Pierce

[57] ABSTRACT

A process for making a smooth perforated contoured resilient panel of a type suitable for use as a decorative headliner in the passenger compartment of vehicles or the like. A thermoplastic composite laminar sheet comprising a pair of films tenaciously bonded to the opposed faces of an intervening thermoplastic foam core having closed cells containing air and residual blowing agent is perforated in flat sheet form whereafter it is heated to an elevated temperature to effect heat softening and expansion of the foam core resulting in localized dimpled recesses in the faces adjacent to the apertures or perforations. The heated expanded sheet is thereafter thermoformed between appropriately contoured mold surfaces to effect a contouring and compaction of the sheet to a thickness substantially equal to or less than the thickness of the dimpled or recessed sections forming a contoured sheet having substantially smooth exterior surfaces. The compacted and contoured smooth sheet thereafter is cooled to effect rigidification and retention of the contoured configuration thereof. The process further contemplates the application of a decorative layer to the sheet prior to or subsequent to the heating and molding operation.

14 Claims, 7 Drawing Figures

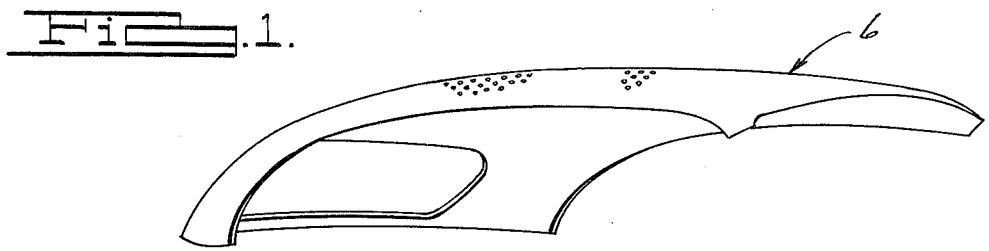
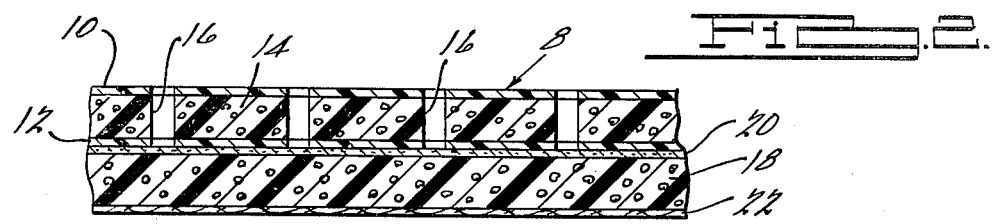
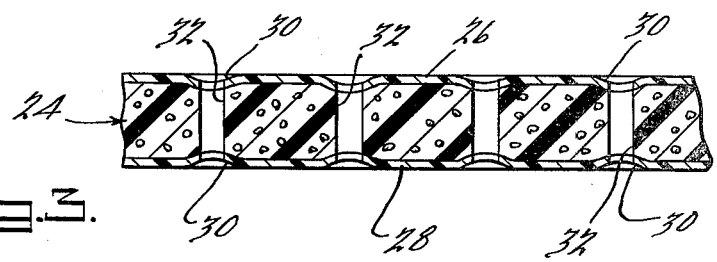
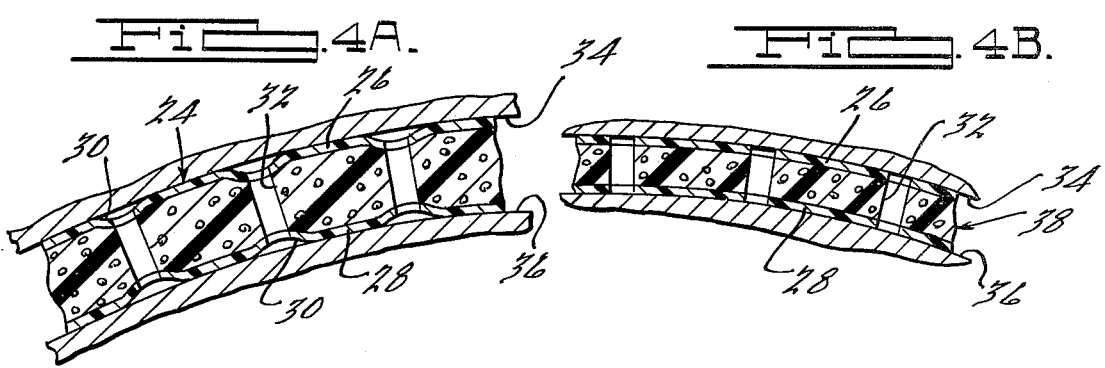
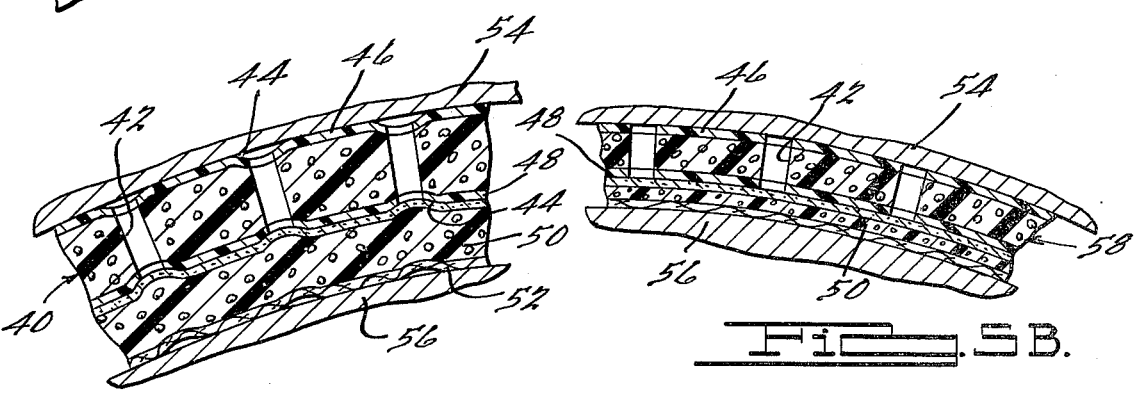

4,211,590

METHOD OF MAKING PERFORATED CONTOURED TRIM PANEL

BACKGROUND OF THE INVENTION

The present invention is particularly applicable, but not necessarily restricted to the manufacture of resilient perforated contoured panels of the type employed for trimming the interior of passenger compartments of automobiles and the like. More particularly, the process provides for distinct benefits and advantages in the manufacture of resilient headliners of the so-called snap-in type which are adapted to be positioned adjacent to the underside of steel roof panels of vehicles in order to impart the desired aesthetic appearance and to further provide insulation against the transmission of noises into the interior of the passenger compartment.

A variety of materials and structures have heretofore been used or proposed for use in the fabrication of snap-in type headliners of which those disclosed in U.S. Pat. Nos. 3,506,532 and 3,507,728 are typical. Considerations of costs, ease of installation, weight, durability and sound and heat insulation have occasioned the use of composite laminar sheets comprised of a foam core incorporating one or two impervious face sheets bonded to the surfaces of the core as a material for use in the manufacture of such headliner panels. Composite foam core structures of the foregoing type comprised of thermoplastic polymers are particularly suitable because of their ability to be thermoformed to a variety of contours including recesses or embossments for accommodating accessory equipment such as windshield visors, safety belt harnesses, radio speaker housings or the like.

A continuing problem associated with the manufacture of composite contoured trim panels comprised of thermoplastic foam core laminates has been the formation of undesirable surface irregularities in the localized areas surrounding perforations or apertures through the panel which in many instances are visible in spite of the use of decorative coatings or layers detracting from the aesthetic appearance of the trim panel. The provision of such perforations over all or over selected portions of the panel are desirable in some instances to provide for controlled modifications in the acoustical characteristics of the panel. In order to overcome such a dimpling or surface distortion of perforated panels it has heretofore been proposed to first thermoform the panel in an imperforate condition to a desired molded contour and thereafter impart perforations to the resultant contoured panel. This proposal has been found commercially unsatisfactory because of the high cost of tooling required to effect satisfactory perforation of a contoured panel due to the fragile nature of the composite foam core sheet.

The process of the present invention overcomes many of the problems and disadvantages associated with prior art techniques by providing a simple, economical and efficient method whereby perforated thermoplastic composite foam core laminates can be thermoformed to produce a resultant panel in which the faces thereof are substantially devoid of any surface irregularities or dimples in the vicinity adjacent to the perforations thereby providing increased versatility in the types of decorative finishes that can be applied and further enhancing the appearance of the resultant contoured trim panel.

SUMMARY OF THE INVENTION

The benefits and advantages of the present invention are achieved by a method in which a composite laminar sheet is formed comprising a pair of thermoplastic films which are tenaciously bonded to the face surfaces of an intervening thermoplastic foam core having closed cells containing air and residual blowing agent. An appropriately sized section of the sheet is perforated while in a substantially flat condition to impart a plurality of apertures therethrough extending in a selective pattern over all or selected portions of the surface thereof. The perforated sheet is thereafter heated to an elevated temperature above the glass transition temperature of the thermoplastic materials to effect a heat softening thereof and a post-blow and expansion of the foam core producing an expanded sheet characterized as having dimpled recesses in the faces thereof in the vicinity surrounding the apertures defining thin sections of reduced thickness in comparison to the thickness of the adjacent non-perforated areas. The expanded heated sheet is thereafter placed between mold surfaces and is thermoformed to effect a contouring thereof and a compaction of the composite laminar sheet to a thickness substantially equal to or less than the thickness of the thin sections whereby a contoured sheet is produced having substantially smooth exterior faces. The resultant thermoformed and compacted sheet is cooled to a temperature below the glass transition temperature and to effect a rigidification thereof and the resultant rigidified panel is thereafter extracted from the mold.

In accordance with a preferred embodiment of the present invention, the contoured trim panel is provided with a suitable decorative coating on one face surface thereof which may be applied either before or following the thermoforming operation. In a particularly preferred embodiment, the decorative layer comprises a resilient foam layer having a decorative sheet such as a knitted fabric bonded to one face thereof with its opposite face adhesively bonded to the composite perforated sheet. The composite assembly is subsequently thermoformed as a unit providing for still further economies and efficiency in manufacture.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a perspective view of a typical snap-in headliner produced in accordance with the practice of the method of the present invention;

FIG. 2 is a magnified fragmentary cross sectional view of a composite headliner illustrating the laminar and perforated structure thereof;

FIG. 3 is a magnified fragmentary transverse sectional view through a composite perforated foam core laminate illustrating the dimpled surface structure thereof at the completion of the heating and post-blowing operation;

FIG. 4A is a magnified fragmentary transverse sectional view illustrating the heated and expanded panel of FIG. 3 positioned between contoured mold surfaces prior to compaction thereof;

FIG. 4B is similar to FIG. 4A illustrating the disposition of the composite foam core laminate after compaction between the mold surfaces;

FIG. 5A is a magnified fragmentary transverse sectional view of a composite foam core laminate having a resilient foam decorative layer adhesively bonded thereto positioned between appropriately contoured mold surfaces; and FIG. 5B is similar to 5A but wherein the composite laminar assembly has been compressed and compacted between the mold surfaces.

DESCRIPTION OF THE PREFERRED EMBODIMENTS

Referring now in detail to the drawings, and as may be best seen in FIG. 1, a typical contoured perforated resilient headliner 6 is illustrated which is suitable for manufacture in accordance with the practice of the present invention. As shown, the headliner 6 is of a smooth contoured concave configuration along its inner surface which generally conforms to the contour of the steel roof panel of an automobile body over which it is adapted to be installed. Resilient headliners of the so-called snap-in type are of sufficient flexibility and strength to enable bending or deformation during installation in an automobile body to effect engagement of the edges of the headliner with appropriate mounting channels along the inner surface of the vehicle body forming therebetween a snap-fit.

The structural features of the headliner 6 in accordance with a preferred practice of the present invention is shown in FIG. 2. As illustrated, the headliner comprises a composite laminar sheet 8 comprising thermoplastic films 10, 12 tenaciously bonded in supported relationship to the face surfaces of an intervening coextensive thermoplastic foam core or layer 14. The composite sheet 8 incorporates a plurality of perforations 16 extending through the films and foam core from one face to the opposite face thereof. A composite decorative layer comprising a resilient foam 18 is bonded such as by an adhesive layer 20 to the exterior face of the thermoplastic film 12. A finish decorative sheet such as a knitted fabric 22 is adhered to the exterior face of the resilient foam layer 18. The composite decorative layer may also be provided with perforations, if desired, to achieve the desired acoustical and decorative characteristics of the headliner.

It will be appreciated that alternative decorative finishes can be applied to the composite perforated laminar sheet including plastic films such as vinyl having a smooth or grained texture as well as sprayed-on finishes including paint.

The composite laminar sheet 8 is comprised of any thermoplastic material which is capable of being thermoformed into a shape retaining contoured panel. An appropriate selection of plastic materials for the films and foam core is made in consideration of providing a panel possessed of sufficient flexibility and resiliency to enable bending thereof during installation in a vehicle as well as of sufficient strength to be self-supporting over its length and width when secured along its edges in spaced relationship beneath the steel roof panel of an automobile. Additionally, the thickness of the films 10, 12 and the foam core layer 14 can be varied so as to achieve the desired strength depending upon the distance between the supported edges of the trim panel to avoid objectional sagging of the center portion thereof. In this connection, film thicknesses ranging from about 3 up to about 60 mils (0.003 to 0.060 inch) are usually satisfactory while film thicknesses of about 4 to about 8 mils are usually adequate for most installations. The foam core layer can range in thickness of about 1/32 up to about 1 inch while thicknesses of from about 1/16 up to about ½ inch are generally satisfactory for most installations. The foam core layer is further characterized by a closed cell structure of a configuration having a low degree of orientation with respect to the direction of the sheet and having an average cell size of less than about 0.5 millimeters, and preferably less than about 0.25 millimeters. The foam core layer prior to post-blowing generally ranges in density from about 4 up to about 10 pounds per cubic foot with densities of about 5 to about 6 pounds per cubic foot being preferred.

The cellular foam core structure is further characterized as one incorporating residual blowing agents and air which upon a heating of the composite laminar sheet to an elevated temperature prior to the thermoforming operation effects a post-expansion of the sheets to a thickness of at least 1.5 times its original thickness and preferably from at least about 1.8 up to about 3 times its original thickness. The post-expansion of the foam core during preheating prior to thermoforming is achieved by the expansion of air and entrapped residual blowing agents within the closed cell structure of the foam. The blowing agents preferably comprise inert organic materials including hydrocarbons such as $C_4$ to $C_7$ of which pentanes are typical of halo hydrocarbons such as Freon 11 or 12 which are liquid at normal room temperature but are gaseous at the elevated temperatures employed during the thermoforming operation. The quantity of residual blowing agents present will vary depending upon the age of the composite sheet since its manufacture and conditions of storage in that such blowing agents tend to diffuse over a period of time and are replaced with air. It has been found that the optimum conditions for thermoforming composite laminar sheets incorporating isopentane, for example, in a polystyrene foam core are achieved within a period of about 5 days up to about 60 days after sheet manufacture to achieve post-blowing of the structure within the parameters previously set forth. In either event, a heating of the foam core from room temperature to the thermoforming elevated temperature causes a heat softening of the foam structure and an expansion of the gaseous constituents entrapped therein to effect a post-expansion of the composite laminar sheet.

The thermoplastic polymer of which the foam core is comprised is preferably one having a tensile strength of at least 2,500 psi, and preferably at least 7,800 psi as determined by ASTM D-638; a tensile modulus of at least $1.0 \times 10^5$ psi, and preferably at least $4.5 \times 10^5$ psi. In order to provide adequate strength to avoid sagging even when the passenger compartment attains relatively high temperaures such as when parked in the sun in southern states, during the summertime, polymers having a glass transition temperature (Tg) of at least about 200° F. up to a level below that at which thermal degradation of the polymer occurs are preferably employed. Perferably, glass transition temperatures of about 235° up to about 300° F. are preferred.

Thermoplastic polymers suitable for use in fabricating the films of the composite laminar sheet similarly are characterized as being possessed of good formability properties employing moderate elevated temperatures and conventional thermoforming equipment. The film polymer is of a tensile strength of at least about 2,000 psi, preferably at least 4,500 psi, a tensile modulus of at least $1.0 \times 10^5$ psi and preferably at least $3.2 \times 10^5$. The thermoplastic polymer of which the films are comprised also preferably have the glass transition temperatures of at least about 200° F. with ranges of from about 235° up to about 300° F. being particularly satisfactory.

A number of thermoplastic polymers are commercially available which can be satisfactorily employed to form the composite laminar sheet possessed of the aforementioned physical characteristics. Included among such thermoplastic polymers are acrylonitrile-butadiene-styrene (ABS), polycarbonates, polystyrene and modified polystyrene polymers. Of the foregoing, modified polystyrene copolymers incorporating small but controlled amounts of chemical modifying agents are preferred due to their excellent physical properties and their low cost. Modified polystyrene polymers which are suitable include copolymers of styrene with ionomers such as acrylic, methacrylic, fumaric, itaconic, and sulfonic acid, as well as maleic anhydride, and copolymers with monomers such as alpha-methylstyrene, 2–5 dichlorostyrene, and the like. Particularly satisfactory results are obtained by the use of maleic anhydride in amounts of about 2% up to about 15% by weight of the copolymer. A copolymer containing about 8% maleic anhydride by weight is commercially available under the brand designation Dylark 232 from Arco/Polymers, Inc.

The films of the composite laminar sheet can be composed of the same polymer as the foam core although they preferably incorporate minor amounts of additional modifying agents to increase their impact resistance. For example, the inclusion of small amounts of butadiene in a modified polystyrene polymer provides for impact strength as determined by the Izod impact method of values greater than 2.7 foot pounds per inch. Impact values of the foregoing magnitude can be achieved by the inclusion of about 6 to about 12% butadiene in a maleic anhydride modified styrene copolymer. A polymer of the foregoing type comprising about 88% styrene, about 3.2% maleic anhydride and about 8.8% butadiene by weight is commercially available under the brand name Dylark 250 from Arco/Polymers, Inc.

In any event, the composite laminar sheet is comprised of a thermoplastic foam core and thermoplastic films of a composition such that they are possessed of substantially the same glass transition temperature enabling thermoforming thereof at temperatures above their glass transition temperature but below that temperature at which thermal degradation of the polymer occurs. Usually, depending on the specific polymer used, thermoforming temperatures of about 235° up to about 350° F. are satisfactory. At such moderate elevated temperatures, no thermal degradation of the cellular foam structure occurs and a post expansion of the sheets to at least 1.5 times its original thickness is obtained. Additionally, temperatures of the foregoing magnitude enable thermoforming of the laminar sheet by conventional techniques in combination with certain heat-resistant decorative coating materials without any adverse effects on the decorative fabric or plastic layer.

The composite laminar sheet 8 can be manufactured by any one of a variety of techniques including a tenacious bonding of the films to a separately produced foam core utilizing an adhesive or solvent bonding or heat sealing of the assembly into an integral laminate. In accordance with a preferred aspect of the present invention, the composite laminate is produced in accordance with the process disclosed in U.S. Pat. No. 3,616,020, the substance of which is incorporated herein by reference. The process as defined in the aforementioned United States Patent utilizes a continuous extruding of thermoplastic films through dies directly onto both face surfaces of a heat-fusible foam sheet as it moves past the dies. The foam sheet having the extruded films on both faces thereof is thereafter compressed between rolls, one of which is a chill roller and the other a nip roller. The nip roller preferably is heated to an elevated temperature which will vary depending upon the type of thermoplastic resin employed. The heat capacity of the hot thermoplastic film and the heat applied by the nip roll effects a melting of a thin layer of the heat-fusible foam sheet effecting a mutual fusion between the film and foam which upon subsequent cooling provides a tenacious bond over the entire interface therebetween.

In accordance with the process, a composite laminar sheet of the desired composition and thickness is provided which is cut to a desired size and is thereafter perforated to provide a plurality of perforations therethrough. Generally, the perforations are of a circular configuration and are of a diameter ranging from about ⅛ up to about ¼ inch. The perforations are applied either in a random or preset pattern such as a triangular pattern and are usually spaced at least about ¾ inch from each other. The perforation is performed with the laminar sheet in a substantially flat condition.

Thereafter, the flat perforated laminar sheet is heated to an elevated temperature to effect a heat softening thereof enabling subsequent thermoforming. The degree of heating will vary depending upon the glass transition temperature of the polymers employed and the specific thermoforming technique to be used. The heating of the laminar sheet can be effected by any one of a variety of techniques including radiant heating, a recirculating hot air oven, or the like, in which the sheet is supported in a manner so as to enable post-expansion upon attaining a temperature above the glass transition temperature of the foam core resulting in a free-blown thickness of at least 1.5 times its original thickness. It is important in the practice of the present process that the composite laminar sheet be restrained during the preheating step prior to thermoforming to avoid shrinkage and surface irregularities particularly when a decorative layer has been bonded to one face thereof. In accordance with a preferred practice, the restraint is achieved by clamping at least two opposite longitudinal edges between suitable clamping fixtures such as tenter frames maintained at a fixed distance while subjecting the face surfaces of the laminar sheet to infrared radiation. The clamped edges preferably correspond to those which are parallel to the original direction of extrusion of the foam core layer and overlying films.

An expanded composite laminar sheet 24 is shown in FIG. 3 in which the upper film 26 and the lower film 28 are characterized as having a plurality of recesses or dimples 30 in the area immediately surrounding the perforations 32. The dimpled surface of the expanded laminar sheet results from the presence of the perforations as well as the puncture or rupture of the foam cell structure in the vicinity immediately adjacent to the perforations permitting escape of air and residual blowing agent wherein such sections undergo a lower magnitude expansion in comparison to the remaining non-perforated sections of the sheet. The depth of the dimples 30 will vary depending upon the magnitude of the post-expansion of the laminar sheet during the preheating operation.

The composite laminar sheet 24 in an expanded heat softened condition is thereafter placed between upper and lower contoured mold surfaces 34, 36 as shown in FIG. 4A in which a pre-selected contour is imparted in response to a closing of the mold. Further closure of the mold surfaces 34, 36 effects a compaction of the expanded laminar sheet 24 to a condition as shown in FIG. 4B resulting in a compaction of the foam core and the films 26, 28 bonded thereto in the non-perforated areas to a thickness equal or less than the thickness of the dimpled sections producing a compacted laminar sheet 38 characterized as having substantially smooth face surfaces over the entire inner and outer areas thereof. The contoured and compacted sheet 38 is retained between the mold surfaces 34, 36 for a period of time sufficient to effect a cooling of the sheet below its glass transition temperature in order to effect a rigidification thereof to retain the compacted and contoured configuration. Thereafter, the molded sheet is withdrawn from the mold and is trimmed. Usually, mold retention time of from about 5 seconds up to about 1 minute are satisfactory for the cooling cycle and will vary depending upon the Tg temperature of the thermoplastic materials employed, the preheat temperature to which the sheet is heated preliminary to thermoforming, the presence or absence of a decorative coating and the temperature and heat conductivity of the particular mold employed.

A suitable decorative finish can be applied to the contoured panel before or after the trimming operation as desired. In accordance with a preferred embodiment of the present process, a decorative layer is applied to one face of the perforated sheet prior to the preheating and thermoforming operation. With reference to FIG. 5A, a perforated expanded sheet 40 is shown incorporating perforations 42 therethrough and dimples 44 in the surface of upper and lower films 46, 48. A flexible decorative foam layer 50, such as polyurethane foam, for example, is adhesively bonded to the outer face of the film 48 and a suitable woven or knitted fabric sheet 52 is bonded to the exterior surface of the flexible foam layer 50. After preheating to the appropriate temperature, the assembly as shown in FIG. 5A is placed between contoured mold surfaces 54, 56 which effects an appropriate contouring of the composite assembly in response to closure of the molds. As shown in FIG. 5B, further closure of the mold surfaces 54, 56 results in a substantially complete compaction of the decorative resilient foam layer 50 and a further compaction of the expanded sheet 40 in a manner as previously described in connection with FIG. 4B producing a composite compacted laminar sheet 58 devoid of any undesirable surface irregularities such as the dimples 44 of FIG. 5A. After appropriate cooling to effect rigidification of the expanded sheet, the mold is opened and the resilient decorative foam layer 50 returns to its uncompacted condition as shown in FIG. 5A while the thermoplastic foam laminar sheet retains its smooth contoured compacted configuration. The resultant composite headliner produced is thereafter trimmed to the desired size and shape.

In accordance with a specific exemplary embodiment of the present process, a composite foam core laminar sheet is provided having a nominal thickness of 0.135 inch comprised of a foam core composed of Dylark 232 of a density of about 5 to about 6 pounds per cubic foot having films of Dylark 250 of a thickness of 6 to 8 mils fusion bonded to each face thereof. A section of appropriate size is perforated to apply perforations of a nominal diameter of 3/16 inch in a triangular pattern at spacings of one inch over selected sections of the sheet. Thereafter, a composite decorative layer comprising a flexible polyurethane foam of about $\frac{1}{8}$ inch thick and a knit fabric bonded to one face thereof is adhesively secured to the perforate foam laminar sheet. The resultant assembly is preheated at a temperature of about 240° to about 270° F., which is above the Tg temperature of about 235° F. of the foam laminar sheet whereafter the heated assembly is placed between cool male and female molds and thermoformed. During the preheating step the composite foam core laminar sheet expands to a free blown thickness of about 0.25 inch and is characterized by a plurality of dimples in the surfaces of the films adjacent to the perforations therethrough. During the thermoforming operation, the expanded composite foam core laminar sheet and decorative layer are compacted so that the final composite foam core laminar sheet is of a final thickness of 0.185 inch.

While the process as herein disclosed has made reference particularly to the fabrication of snap-in type headliners, it will be understood that alternative trim panels for other sections of the passenger compartment of automobiles can similarly be fabricated including, but not limited to, package trays, rear window shelf panels, door panel sections, quarter panel trim sections, or the like.

While it will be apparent that the preferred embodiments of the invention are well calculated to fulfill the objects above stated, it will be appreciated that the invention is susceptible to modification, variation and change without departing from the proper scope or fair meaning of the subjoined claims.

What is claimed is:

1. The method of making a smooth contoured resilient panel comprising a composite laminar sheet consisting of a pair of thermoplastic films tenaciously bonded to the face surfaces of an intervening thermoplastic foam core having closed cells containing residual blowing agent and air which comprises the steps of providing a substantially flat section of said sheet, perforating said sheet to impart a plurality of apertures therethrough over at least a portion of the surface thereof, heating said sheet to an elevated temperature sufficient to effect a heat softening thereof and a post-blow and expansion of said foam core producing an expanded sheet incorporating local dimpled recesses in the faces thereof in the vicinity surrounding the apertures defining thin sections of reduced thickness relative to that of the adjacent non-perforated areas of said sheet, thermoforming the heated expanded said sheet between mold surfaces to effect contouring thereof and compaction of said foam core to a thickness of at least equal to the thickness of said thin sections forming a contoured sheet having substantially smooth exterior faces, and thereafter cooling the contoured compacted said sheet to effect rigidification thereof and retention of the compacted contoured configuration.

2. The method as defined in claim 1 in which the step of heating the perforated said sheet is performed to effect an expansion of said foam core to an expanded thickness at least 1.5 times the original thickness of said sheet.

3. The method as defined in claim 1 in which the step of heating the perforated said sheet is performed to effect an expansion of said foam core to an expanded thickness of at least about 1.8 up to about 3 times the original thickness of said sheet.

4. The method as defined in claim 1 in which said films and said foam core are comprised of a thermoplastic resin selected from the group consisting of polystyrene, modified polystyrene copolymers, polycarbonate and acrylonitrile-butadiene-styrene.

5. The method as defined in claim 1 in which said foam core prior to post-blow is of a density of about 4 to about 10 pounds per cubic foot and of a thickness of about 1/32 to about 1 inch.

6. The method as defined in claim 1 in which said films are of a thickness of about 3 to about 60 mils.

7. The method as defined in claim 1 in which said foam core layer comprises a polystyrene copolymer of styrene and about 2 to about 15% by weight maleic anhydride.

8. The method as defined in claim 1 in which said films and said foam core are comprised of polymers having substantially the same glass transition temperature in a range of at least about 200° to about 300° F.

9. The method as defined in claim 1 in which the step of heating said sheet is performed to heat said sheet to a temperature above the glass transition temperature to within a range of about 235° to about 350° F.

10. The method as defined in claim 1 including the further step of bonding a decorative layer to the exterior surface of one of said films of the rigidified contoured said sheet.

11. The method as defined in claim 1 including the further step of bonding a decorative layer to the exterior surface of one of said films after said perforating step and before said heating step.

12. The method as defined in claim 1 in which the heating of said sheet to an elevated temperature includes the further step of restraining said sheet to substantially restrict shrinkage thereof.

13. The method as defined in claim 1 in which the heating of said sheet to an elevated temperature includes the further step of clamping at least two opposed edges of said sheet at a substantially fixed distance to prevent significant shrinkage of said sheet during heating.

14. The method as defined in claim 13 in which said sheet extends in unsupported relationship between the clamped said opposed edges.

* * * * *